(12) United States Patent
Tacoma

(10) Patent No.: US 8,875,337 B2
(45) Date of Patent: Nov. 4, 2014

(54) LONG-HANDLED DEVICE FOR PERSONAL HYGIENE AND DAILY LIVING

(76) Inventor: Deborah Tacoma, Zeeland, MI (US)

( * ) Notice: Subject to any disclaimer, the term of this patent is extended or adjusted under 35 U.S.C. 154(b) by 877 days.

(21) Appl. No.: 12/145,906

(22) Filed: Jun. 25, 2008

(65) Prior Publication Data

US 2009/0159487 A1   Jun. 25, 2009

Related U.S. Application Data

(60) Provisional application No. 60/953,257, filed on Aug. 1, 2007.

(51) Int. Cl.
*A47K 7/02* (2006.01)
*A47K 7/08* (2006.01)

(52) U.S. Cl.
CPC .. *A47K 7/08* (2013.01); *A47K 7/028* (2013.01)
USPC .............. 15/209.1; 15/145; 15/146; 15/210.1

(58) Field of Classification Search
USPC ............... 15/145, 147.1, 147.2, 176.1, 176.6, 15/209.1, 210.1, 244.1; 132/75.6, 76.5, 132/308, 309, 310, 311; 294/19.1, 19.4
See application file for complete search history.

(56) References Cited

U.S. PATENT DOCUMENTS

| | | | |
|---|---|---|---|
| 2,864,110 A | 12/1958 | Bruger | |
| 2,947,564 A | 8/1960 | Winther | |
| 4,256,409 A | 3/1981 | Manley | |
| 4,987,634 A * | 1/1991 | Weihrauch | 15/209.1 |
| 5,044,040 A | 9/1991 | Tetrault | |
| 5,067,194 A | 11/1991 | Rosenfeld et al. | |
| 5,265,337 A | 11/1993 | Lowder | |
| 5,335,417 A | 8/1994 | Genero et al. | |
| 5,528,786 A | 6/1996 | Porat et al. | |
| 5,609,255 A | 3/1997 | Nichols | |
| 5,862,564 A | 1/1999 | Hamm | |
| 5,875,512 A | 3/1999 | Lathan | |
| 5,887,314 A | 3/1999 | Jordan, Jr. | |
| 5,924,167 A * | 7/1999 | Wright et al. | 15/339 |
| 5,924,175 A | 7/1999 | Lippitt et al. | |
| D428,147 S | 7/2000 | Wenger et al. | |
| 6,145,154 A * | 11/2000 | Blair | 15/210.1 |
| 6,158,077 A | 12/2000 | Wenger et al. | |
| 6,189,175 B1 | 2/2001 | Priester | |
| 6,269,516 B1 | 8/2001 | Saatjian et al. | |
| 6,272,716 B1 | 8/2001 | Thornton | |

(Continued)

FOREIGN PATENT DOCUMENTS

EP        0 885 699 A1    12/1998

*Primary Examiner* — Monica Carter
*Assistant Examiner* — Michael Jennings
(74) *Attorney, Agent, or Firm* — Young Basile Hanlon & MacFarlane PC

(57) ABSTRACT

A long-handled personal holder device for personal cleaning, hygiene, and daily living, and is made of resilient material with extendable finger-like grips. The grips are configured to surely grip a tool, but also to release (e.g., so that a user does not have to soil their hands). The curved handle allows proper reach, and is designed for easy break-down, rinsing and cleaning, and for placement in a compact carry bag. The grips can grip a larger personal hygiene flushable wipe, a smaller flushable pad, a sponge for shower use, and/or a an ointment pad; and are also able to hold more rigidly-handled personal tools, such as a toothbrush, shaver, makeup applicator, pencil, pen, brush, and similar items.

2 Claims, 8 Drawing Sheets

(56) References Cited

U.S. PATENT DOCUMENTS

| | | |
|---|---|---|
| 6,415,470 B1 | 7/2002 | Ramrattan |
| 6,499,218 B2 | 12/2002 | Rocha |
| 6,611,986 B1 | 9/2003 | Seals |
| 6,823,555 B2 * | 11/2004 | Warren ................ 15/176.2 |
| 6,865,776 B2 | 3/2005 | Spinelli |
| 6,925,686 B2 | 8/2005 | Heathcock et al. |
| 6,981,293 B2 | 1/2006 | Steinberg |
| 7,059,008 B2 | 6/2006 | Morgan et al. |
| 7,530,138 B1 * | 5/2009 | Platt ......................... 15/210.1 |
| 7,784,141 B2 * | 8/2010 | Knopow et al. ........... 15/210.1 |
| 2003/0110584 A1 | 6/2003 | Clare et al. |
| 2003/0204926 A1 | 11/2003 | Jurgens et al. |
| 2004/0237239 A1 | 12/2004 | Savell |
| 2006/0053574 A1 | 3/2006 | Steinberg |

* cited by examiner

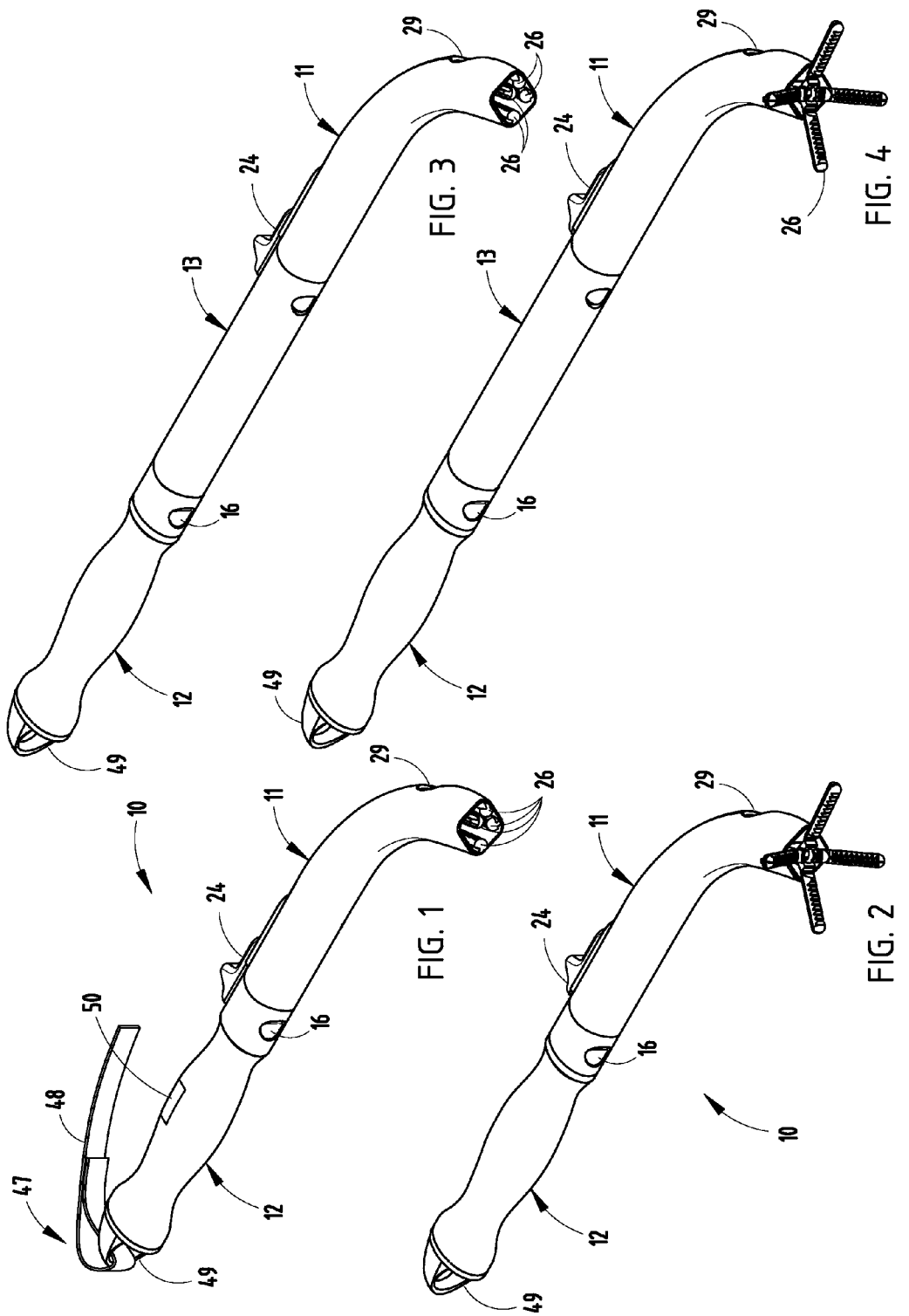

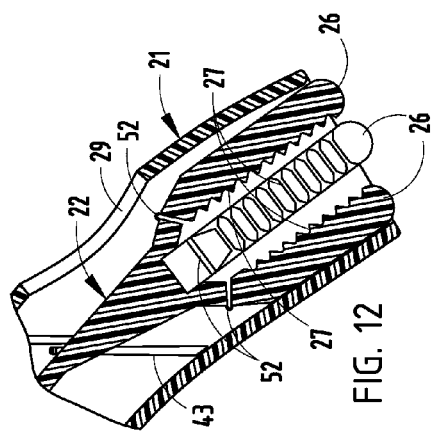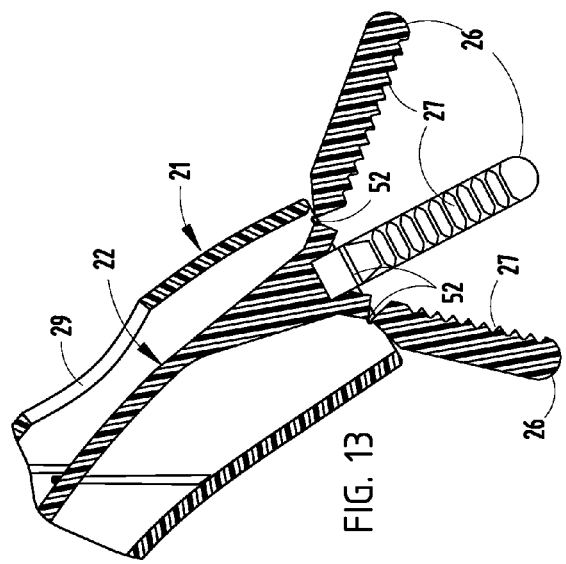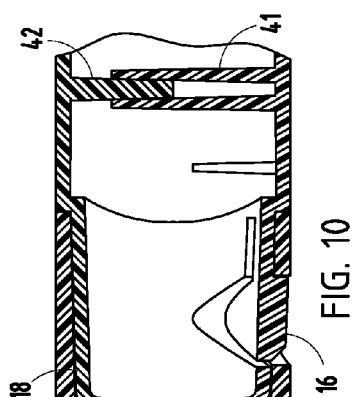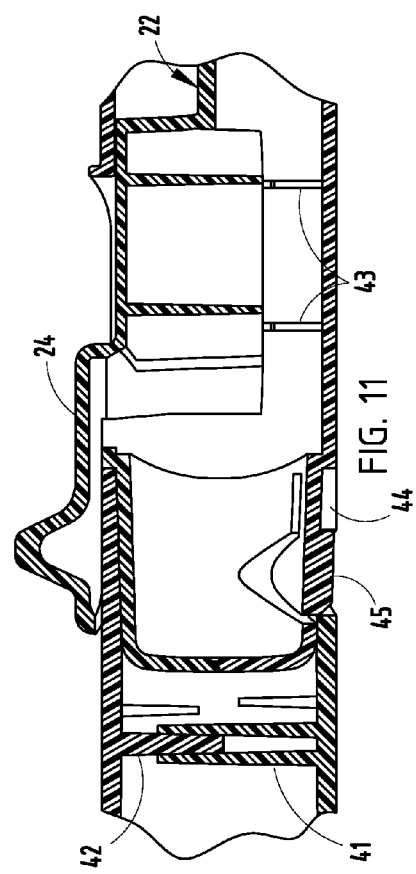

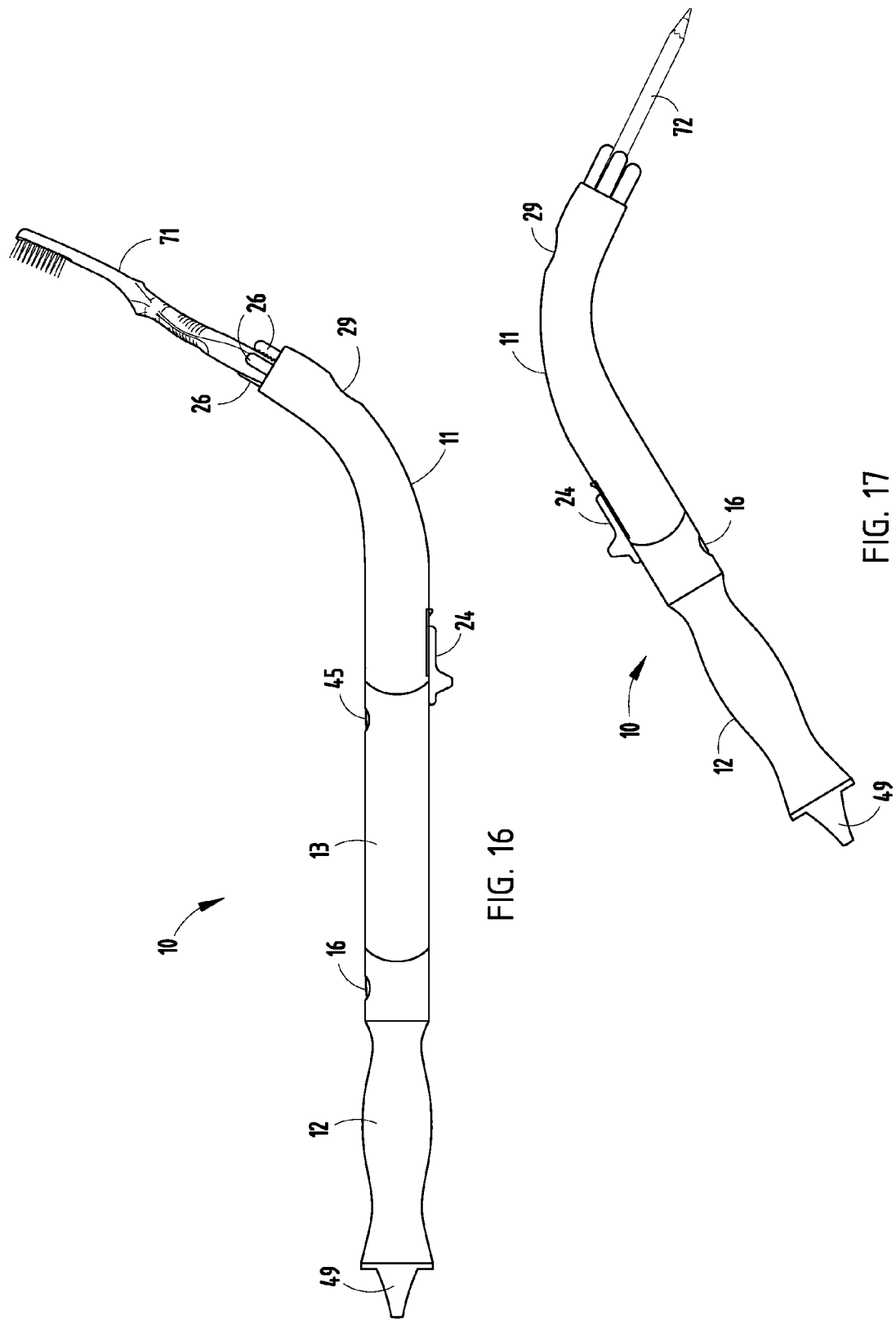

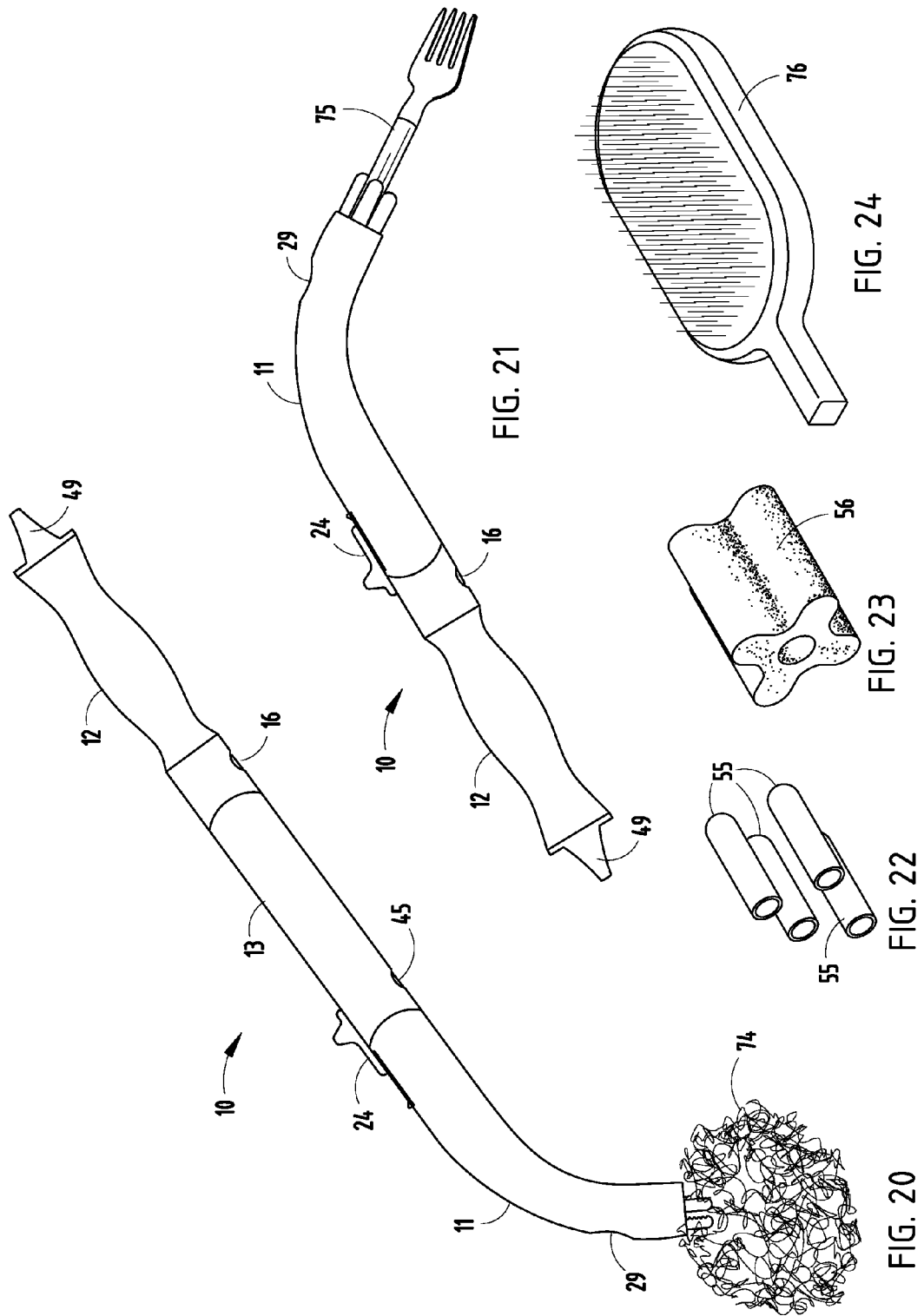

LONG-HANDLED DEVICE FOR PERSONAL HYGIENE AND DAILY LIVING

This application claims benefit under 35 U.S.C. §119(e) of provisional application Ser. No. 60/953,257, filed Aug. 1, 2007, entitled LONG-HANDLED DEVICE FOR PERSONAL CLEANING AND HYGIENE, the entire contents of which are incorporated herein in their entirety.

BACKGROUND

The present invention pertains to a long-handled device for personal cleaning and hygiene, and for daily living activities.

The ability to take care of one's own personal cleaning and hygiene is very important for a person with limitations (e.g., overweight, and/or physical problems such as back pain, poor flexibility, lower-functioning body, fore-shortened arms, etc.). It can relieve stress physically, emotionally and mentally and can increase independence, which can be very important to freedom and self-worth. Decreasing one's stress levels can also help in the healing process. Also, the ability to take care of one's own personal cleaning and hygiene provides greater freedom and reduces the expense of nursing care. Contrastingly, the need to have someone to watch over an individual with limitations twenty-four hours a day is extremely difficult and becomes very expensive. Further, the inability to reach hard-to-reach areas can cause much discomfort for a person with limitations. The embarrassment that comes along with the inability to reach those hard-to-reach places can cause much mental and emotional stress.

A variety of personal hygiene tools presently exist. However, present known tools suffer from a variety of problems such as complexity (and resulting high cost), lack of adaptability for "flexible use," inability to provide freedom and independence to the individual, and can lead to unsanitary conditions including providing poor cleanliness. Known tools do not allow a user to perform multiple tasks. Nor do they fold, collapse, or break down sufficiently for portability, nor for discreet storage and transport. The multiple tasks spoken of here include shaving (women's legs and men's chins), cleaning the rectal area, applying salve to same area, and the ability to grasp a personal hygiene cleaning tool (such as sponge, pad, washcloth or shaver) while in the shower or bath, or while wet after a shower or bath. Though a variety of personal hygiene tools presently exist, no known devices can do multiple tasks, nor are they able to use flushable materials, nor do they fold/collapse down to be a compact portable arrangement that can be carried in a small discreet carry bag.

In particular, known products do not allow a person to use toilet paper, nor a toilet-paper-prefolded product, and then release the soiled flushable material into the toilet without the need to touch it or unwrap it. No known product allows a person to hold a shaver and be able to reach and shave their lower leg. Known products do not allow a person to hold a sponge in order to clean their feet and lower extremities. Also, known products do not allow a person with a physical "ailment" or limitation to be able to reach their bottom with a small personal pad to apply a salve to take care of a rash, and then release it and flush it down the toilet.

Additionally there appears to be no valid personal holder device for assisting with daily living activities. Daily living activities, as referred to herein, include not only personal hygiene tasks, but also include additional tasks that must be done as part of living a relatively normal life. This includes such things as grasping and manipulating personal functional tools in order to take care of one's self. For example, daily living tasks include the need to brush teeth, apply makeup, write with a pencil or mark with an ink pen or marker, scratch one's back, eat with utensils, and brush hair.

SUMMARY OF THE PRESENT INVENTION

In one aspect of the present invention, a combination is provided for assisting a handicapped or physically limited person. The combination includes a personal holder device and a personal functional tool held by the personal holder device in a manner facilitating use of the functional tool. The personal functional tool as referred to herein has a functional end portion and an elongated handle portion to grip while using the functional end. The personal holder device includes a tubular handle defining a longitudinal direction, an actuator button, and an expandable/retractable gripping mechanism in the tubular handle. The gripping mechanism is operably connected to the actuator button for telescoping movement between an extended open position where the fingers move axially and spread apart radially for receiving the handle portion, and a retaining position where the fingers close radially toward each other for gripping the handle portion. The gripping mechanism includes at least three fingers with longitudinally-elongated inwardly-facing surfaces that extend generally parallel each other when in the retaining position for stably engaging at least three sides of a length of the handle portion. The inwardly-facing surfaces include one of a frictional resilient material and a rough surface for providing acceptably strong retention strength when in the retaining position, whereby the functional tool can be oriented and pressure can be placed on the handle portion onto the functional end portion by a user holding onto the tubular handle of the holder device.

In a narrower aspect, the functional tool is selected from a group consisting of at least one of the following: a personal shaver, a toothbrush, a hair brush, a wipe, a make-up applicator, a lotion applicator, a sponge, a lipstick applicator, a back scratcher, an eating utensil, a writing pencil, an ink pen, and a marker.

In another aspect of the present invention, a personal hygiene device includes a tubular handle defining a longitudinal direction and having first and second ends. A gripping mechanism with fingers is located at the first end and is adapted to move between an open position and a retaining position, the fingers when in the retaining position being configured to retain a section of toilet paper with a remainder of the toilet paper extending from and/or retained by the fingers. A button is located adjacent the second end and is operably connected to the fingers for moving the fingers between the open and retaining positions. The tubular handle includes a laterally-facing rinse hole rearward of the gripping mechanism and forward of the button, the hole being configured to receive water and sanitizer and to direct same toward the fingers to cleanse and wash the same after use.

In another aspect of the present invention, a method of personal hygiene comprises steps of providing a personal functional tool having a functional end portion and an elongated handle portion to grip while using the functional end; providing a personal holder device including a tubular handle defining a longitudinal direction and including an expandable/retractable gripping mechanism in the tubular handle that is operably connected to the actuator button for telescoping movement between an extended open position; and moving the fingers axially and radially to an open position for receiving the handle portion. The method further includes moving the fingers to a retaining position where the fingers close radially toward each other and grip the handle portion, manipulating the tubular handle to use the functional end of the tool, and moving the fingers toward the open position to release the tool.

In another aspect of the present invention, a kit includes a long-handled personal hygiene device with an end configured for holding items for personal hygiene and for daily living. The kit also includes a carry bag having a cavity sized less than a length of the assembled long-handled personal hygiene device. The personal hygiene device includes at least two elongated components configured to rigidly engage for use and configured to releasably disconnect for compact storage in the cavity.

In another aspect of the present invention, a kit includes a personal hygiene device with an end configured for holding items for personal hygiene and for daily living, and further includes a first functional tool with a handle portion for performing a first task of personal hygiene and a second functional tool with a handle portion for performing a second task of daily living.

In a narrower aspect, the task of personal hygiene includes at least one of wiping after toileting, applying ointment to a remote area of one's body, scrubbing one's body, shaving one's leg or face, and the first functional tool includes a functional end for performing said first task.

In another narrower aspect, the task of daily living includes at least one of brushing teeth, combing hair, applying makeup, holding an eating utensil, and the second functional tool includes a functional end for performing said second task.

One aspect of the present invention is to provide a personal hygiene device comprising a handle with a finger-type end grip construction including fingers and grippy frictional structure on ends of the fingers.

Another aspect of the present invention is to provide a personal hygiene device comprising a handle and a retainer end, where the personal hygiene device includes a rinse hole near the retainer end.

Another aspect of the present invention is to provide a personal hygiene device comprising a long handle, and including a kit of multiple heads that are attachable to the long handle such as for optimally holding wipes, washcloth, sponge, shaver, ointment pad, and other heads adapted for specialized use.

Another aspect of the present invention is to provide a kit comprising a personal hygiene device with an end configured for holding items for personal hygiene. A quick-attach hanger or loop is included that allows the device to be hung on a stall door or towel bar, while attending to other personal needs.

The present tool provides the ability to shave the lower part of one's legs by its ability to firmly grip a shaver handle. The inability to clean personal areas after using the toilet is solved by attaching the cleaning material in the grippers of the present tool. Notably, the grippers allow convenient and comfortable wiping and but also allow releasing the soiled material into the toilet without the need to touch the soiled material. The inability to reach one's feet and lower leg area is solved with this tool by its ability to grip a body washing device to reach the feet and lower legs.

The present innovative long-handled personal hygiene tool provides freedom when it comes to toiletry use, applying salve to personal areas, washing lower extremities and the ability to reach and shave one's lower legs, even when a physical condition prohibits or severely hampers performing these activities in a normal way. The ability to wipe one's own bottom is greatly needed and desired when a person is physically challenged. The present innovative tool provides added freedom and a sense of independence. The need to have someone always by a patient's side to provide the service is expensive, and experience shows that it is hard to find that many friends and helpers. Also, it costs insurance companies an untold amount of money to provide such services. It is also being recognized that costs of services can be reduced by cutting down on nursing calls when at home or in a hospital.

The present invention is a long-handled tool that can "fold" or break down to be completely and compactly portable in its own carry bag. It is lightweight with a nice size handle. It has a gripper on the end that can be used to hold multiple products all designed for personal hygiene freedom and for personal functional tools.

These and other aspects, objects, and features of the present invention will be understood and appreciated by those skilled in the art upon studying the following specification, claims, and appended drawings.

BRIEF DESCRIPTION OF DRAWINGS

FIGS. 1-2 are perspective views of a two-piece assembled personal holder device, FIG. 1 showing the finger grippers closed and FIG. 2 showing them opened for receiving the handle portion of a functional tool.

FIGS. 3-4 are perspective views of a three-piece assembled personal holder device, FIG. 3 showing the finger grippers closed and FIG. 4 showing them opened for receiving the handle portion of a functional tool.

FIGS. 10-12 are enlargements of FIG. 6 at locations corresponding to the lines VII, VIII, and IX, and FIG. 13 is similar to FIG. 12 but with the finger grippers extended.

FIGS. 14-16 are side views showing use of the present holder device for personal hygiene, including wiping after toileting (FIG. 14, using toilet paper or ointment applicator), shaving (FIG. 15) and brushing teeth (FIG. 16).

FIGS. 17-21 are side views showing use of the present holder device for daily living, including gripping a pencil or marker (FIGS. 17-18), gripping a back scratcher (FIG. 19), gripping a sponge or scrubber (FIG. 20), gripping an eating utensil (FIG. 21).

FIGS. 22-23 are perspective views of adapters for the finger grippers, allowing the grippers to grasp smaller diameter items.

FIG. 24 is a perspective view of a brush usable with the present holder device.

DETAILED DESCRIPTION OF PREFERRED EMBODIMENTS

Figure 5:
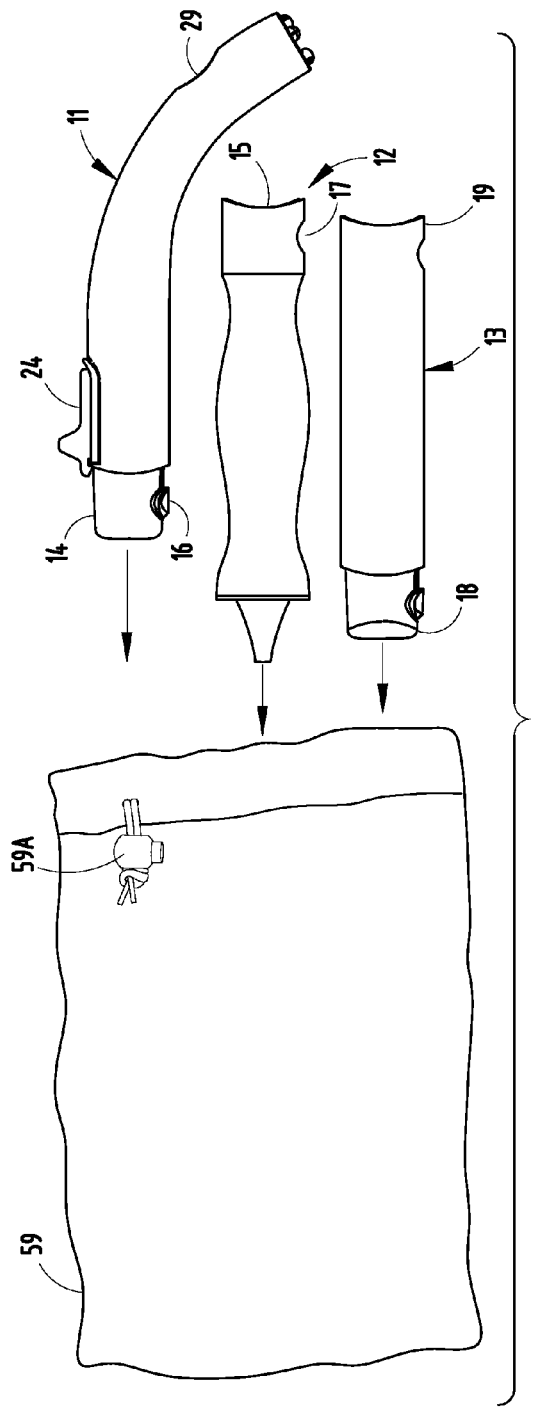
FIG. 5 is a side view of the holder device of FIG. 3 disassembled for fitting into a carry bag.

The present holder device 10 (FIGS. 1-4) is shaped and constructed for use by heavy or handicapped individuals (or care-givers helping the individuals) where the individuals have difficulties wiping themselves when visiting the bathroom, or for applying salve, etc. The device breaks down into multiple pieces (two shown in FIGS. 1-2, and three shown in FIGS. 3-5) so that it can be carried in a small carry-all bag (FIG. 5). The parts are configured to be taken apart for easy cleaning and sterilization. Also, the parts can be made to be dishwasher safe if desired.

The present holder device 10 (FIG. 5) includes a head 11, handle 12, and extension 13 that can be telescopingly snapped together as a two-piece arrangement (head and handle, FIGS.

Figure 6:
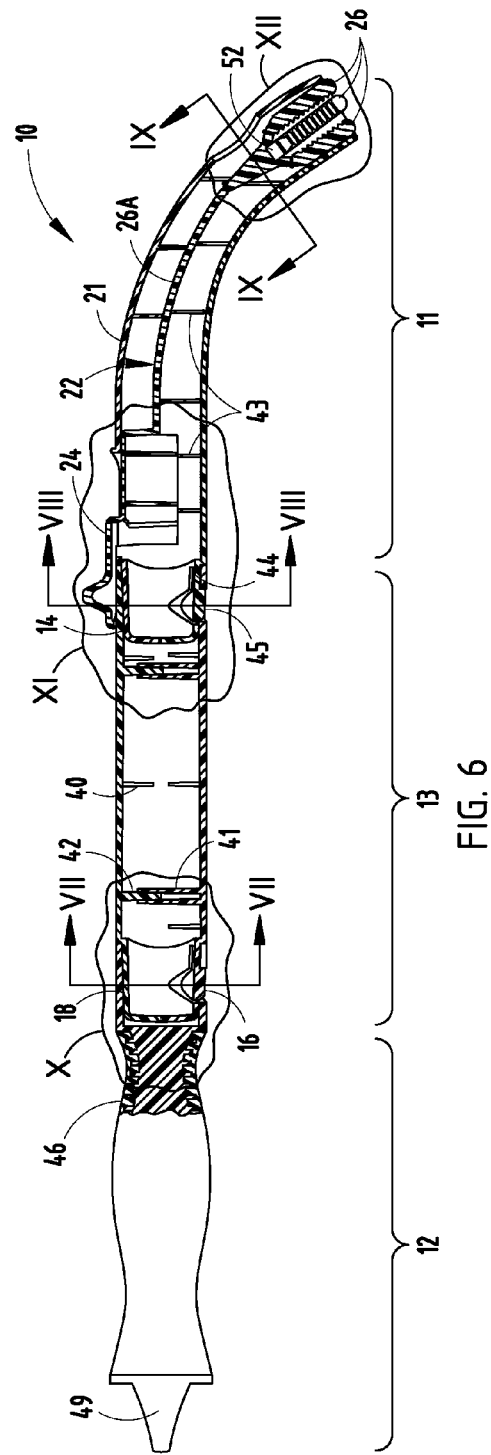
FIG. 6 is a longitudinal cross section taken along a length of the device in FIG. 3, and FIGS. 7-9 are transverse cross sections taken along the lines VII, VIII and IX in FIG. 6.
Figure 9:
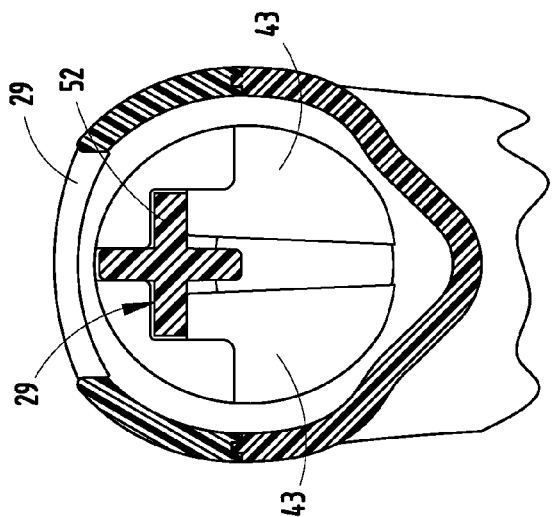
Figure 8:
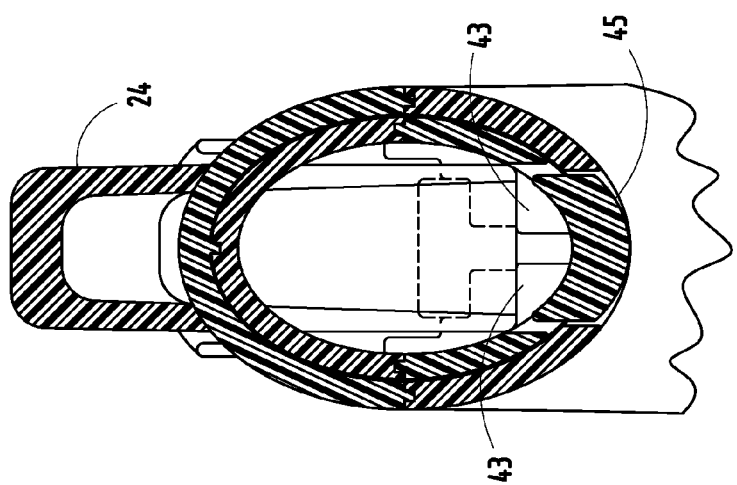
Figure 7:
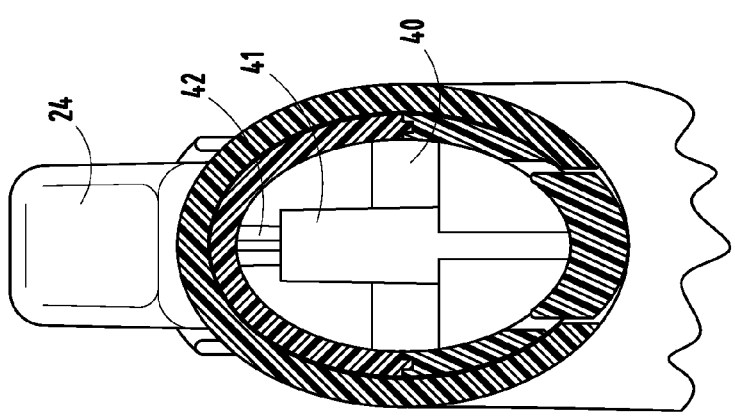

1-2) or as illustrated in a three-piece arrangement (head, handle and extension, FIGS. 3-5), depending on a length needed or desired. The head 11 (FIG. 6) includes a coaxial protrusion 14 (FIG. 5) that telescopingly fits into the open end section 15 of the handle 12, with a spring-biased latch 16 on the protrusion 14 snapping into an opening 17 on the end section 15. The extension 13 has one end 18 that mimics the coaxial protrusion 14, and a second end 19 that mimics the end section 14, such that it can be inserted between the head 11 and handle 12 to create the three piece version.

It is noted that the components 11-13 can be made in a number of different ways. In a preferred way, the components 11-13 each include upper and lower halves made by injection molding and bonded together to form tubular shapes. It is contemplated that the halves can be assembled and secured together in various ways, such as by sonic welding, adhesive, or the like. By manufacturing opposing halves, the internal structure of the halves is exposed during the molding process, such that they can include a variety of different features integrally formed in the halves, including stiffening ribs 40, mating boss and protrusion connecting structure 41 and 42, track-forming ribs 43 for movably supporting the button 24, as well as the resilient spring portion 44 and detent portion 45 of the latch 16. Also, the exterior of components 11-13 can be treated and/or colored as desired. For example, the handle 12 includes a resilient outer coating 46 providing a soft feel to the handle, an optimal handle shape, and providing increased friction when gripped. All of these can be very important, especially for holder devices 10 adapted for individuals with poor grip strength and/or lower finger function.

It is contemplated that a grip assist 47 (FIG. 1) can be provided on the handle 12. For example, the illustrated grip assist 47 includes a strap 48 extended through an end hole 49 and wrapped back to a hook-and-loop retainer 50 (e.g., VEL-CRO® material). The strap 48 can be as stiff as desired to support use and increased stability of the holder device in view of the user's (poor) hand strength, and can be adjusted to an optimal length using the hook-and-loop retainer 50.

The head 11 (FIG. 6) includes a hollow tube section 21 with an internal telescoping sliding member 22. The sliding member 22 is connected at one end 23 to a sliding control button 24 (or integrally formed therewith), and includes a second end 25 with multiple (four) finger grippers 26. The finger grippers 26 are attached to the elongated body straw 26A of the sliding member 22 by living hinges 52, allowing them to be integrally formed when the sliding member 22 is molded. The thickness of the finger grippers 26 is such that, when retracted, the tube section 21 assists in holding them together for gripping action. The finger grippers 26 are movable between a retracted position (FIG. 12) where they are located substantially within the tube section 21. An end of the finger grippers 26 can be designed to remain partially out of the tube section 21 when in the retracted closed position if desired. The partially shielded position of the finger grippers 26 as shown in FIG. 12 helps the finger grippers release a soiled toilet paper product after use while the handle portion of the toilet paper product remains unsoiled; causing it to have sufficient paper strength to "push away" the soiled portion of the toilet paper upon movement toward the extended release position. The finger grippers 26 also are movable to a telescopingly extended position (FIG. 13), where they expand to an open position for receiving the handle portion of a functional tool.

Figure 15:
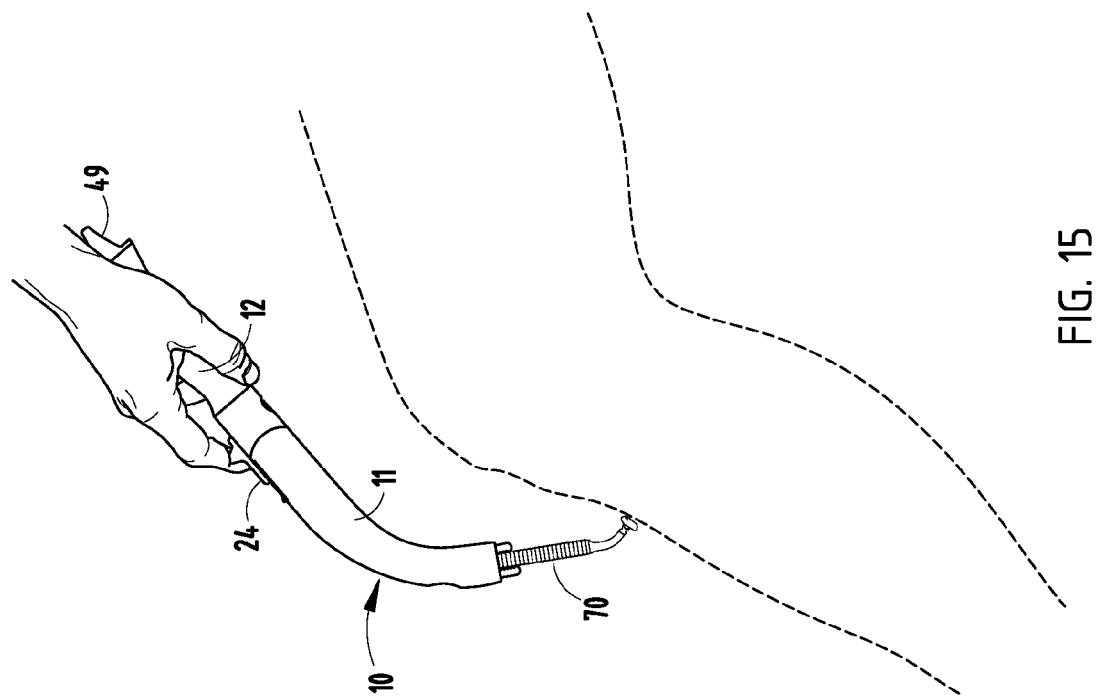

The finger grippers 26 are resilient and relatively stiff, and include a frictional surface 27 to provide positive gripping of a wipe 69 (toilet paper, wet-wipe, wash-cloth, sponge, ointment pad, etc). It is contemplated that the frictional surface 27 can include a variety of different things to increase its ability to hold, such as an irregular shape, a particular inner surface shape configured to grip a particular object's handle, and/or an elastic or rubber material for increased frictional non-slip contact with a handle portion of a functional tool. Also, a detent bump can be added inside the tube section 21 to create a detented holding position when the sliding member is retracted. Alternatively, a coil spring can be added inside the tube section 21 for biasing the button support slide member 26B toward its retracted position. It is contemplated that one or more of the finger grippers 26 can be longer, such as to provide increased torsional support in a particular direction. For example, when in supporting a shaver 70 (FIG. 15) or a toothbrush 71 (FIG. 16), it may be desirable to provide increased support to resist forces generated when pressing the functional tool against one's leg or teeth.

Also, the finger grippers 26 can be shaped with inner surfaces that define larger (or smaller) holes for gripping larger (or smaller) handle portions of the particular functional tool that they are intended to grip such as a pencil 72 (FIGS. 17-18), back scratcher 73, scrubber sponge 74 or fork 75, or brush 76. Concurrently, adapter sleeves 55 (FIG. 22) can be placed on the finger grippers 26 or a star-like sleeve 56 (FIG. 23) can be placed on the handle portion of a functional tool to increase a frictional grip of the finger grippers 26 on a small diameter item.

The illustrated finger grippers 26 are able to grip a variety of different things, including holding a shaver 70 (FIG. 15) in a position for shaving one's legs or for holding a shaver to shave a man's face and neck. Notably, four grippers 26 are shown, and they are positioned in a relatively parallel condition when gripping the square-shaped handle portion of the shaver 70. Thus, the grippers 26 engage all four sides of the shaver handle, and further they engage the handle along a significant portion of its longitudinal length (e.g. about 1 inch). This allows the handle to be gripped with confidence and security, as necessary to avoid dropping the functional tool. The tube section 21 includes a rinse hole 29 near the finger-end, so that water can be forced through the hole and out the second end 25 for cleaning. This is also important for sanitation reasons, when the holder device 10 is used for toileting (FIG. 14).

Figure 14:
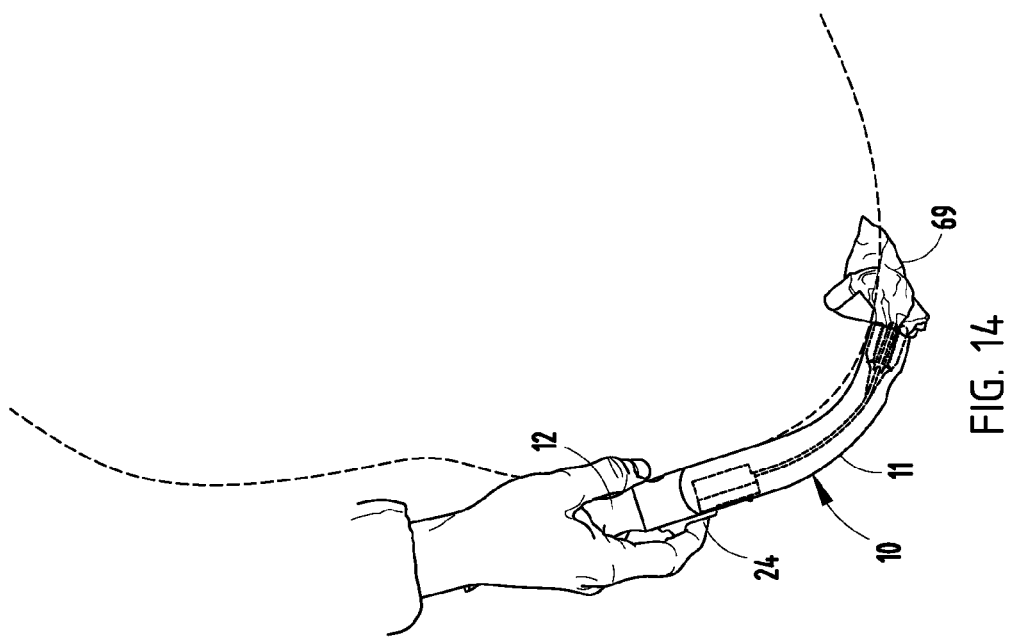
Figure 19:
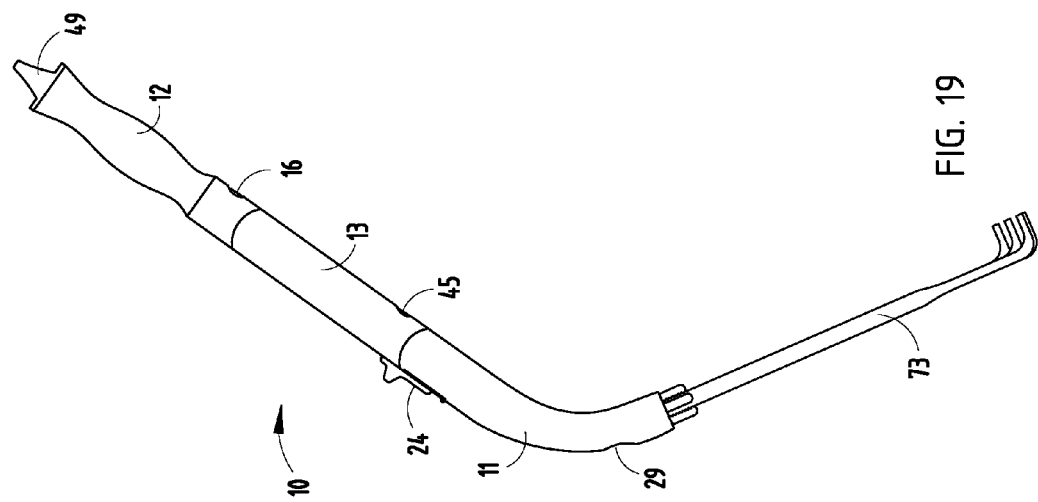
Figure 18:
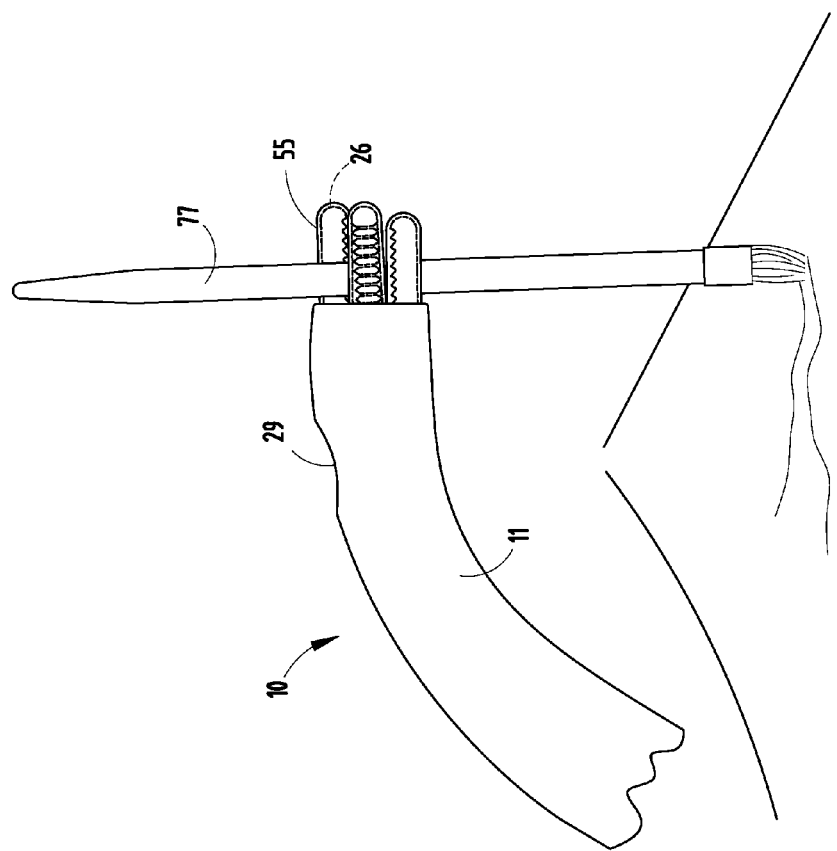

In regard to FIG. 14, it is contemplated that various heads (11) can be provided, such as one best suited for a female, or for a male, or for a particular wiping action, or for a particular preference of a patient user or caregiver. The heads could have similar finger grippers but different shapes of their tube sections (21). Alternately, the device can have different heads best adapted for a particular use. For example, it is envisioned that a second head could be provided that has a tube section similar to tube section 21, but having a bulbous end with a shape similar to a fist-shaped hand. The end could have a movable clasp for gripping the wipe, or could include a frictional outer surface sufficient to hold a sock-like wipe that gets pulled over it. The finger grippers 26 could define, when in a closed position, a transverse groove or a plurality of sufficiently large cross ridges for gripping a paint brush 77 as shown in FIG. 18, or can define a longitudinal groove or ridge for gripping a pencil or ink pen/marker in a manner similar to FIG. 16.

It is contemplated that a kit (FIG. 5) can be assembled to include a zipper bag or drawstring pouch 59 for carrying the device 10 when broken down into storable smaller components (11-13). The illustrated bag includes a drawstring 59A for closure, and is about 9"×6". The bag can potentially be made to have the appearance of a woman's purse or handbag. Alternatively, it is sufficiently small such that it can be placed in a woman's purse or handbag. The kit can also include various functional tools as shown in FIGS. 14-24, and can include individual separated pockets for holding same. Notably, FIG. 22 shows tubular foam that can be placed on the fingers 26 for gripping small diameter pencils or pin-shaped objects, and FIG. 23 shows a single foam piece that can be placed directly on a rod-like handle of a functional tool so that the fingers can grip the functional tool.

It is also contemplated that the handle 12 can include a hole 49 (or hook), and the kit can include a suction cup with projection (or hook) for engaging the hole to hold the device while in a public restroom, with the suction cup being temporarily attached to a smooth wall in the public restroom.

The personal hygiene holder device 10 provides a number of innovative features, including at least the following: 1) a finger-type end-grip construction adapted for releasably holding a wipe such as for toileting or for applying ointment, 2) a handle extension (i.e., two-piece or three-piece as described above), 3) a particular telescoping connection of handle and head that can be telescoped apart and broken down by actuating an integrally-formed spring-biased latch, 4) replaceable and/or interchangeable heads, 5) a rinse hole near the holder end, 6) an end capable of diverse uses for promoting hygiene and daily living activities, including holding a wipe, a wash cloth or sponge, a shaver, an ointment pad, a second handle for patient or nurse use, or for male versus female use, brushing teeth, writing or marking, eating with a utensil, scrubbing, applying makeup, holding a comb or brush, and countless additional uses.

The illustrated Freedom Wand™ device has a handle that can be used by people that have limited movement and/or other physical limitations. Its handle contains finger grippers that can hold (and release) toilet tissue, a scrubbing pad, a small pad for applying ointment/lotions and/or a shaver. The Freedom Wand device is a long-handled wand that consists of three separate interlocking pieces. Each piece is approximately 7 inches long and can be all three locked together or can use only two for a shorter handle. The end piece of the handle has a hole in order to be able to hang the device from a suction cup with a hook, along with a unique firm gripping design to prevent slipping from one's hand. The first piece of the handle has a curve to it and also has moving fingers that slide out and "grab" the toilet tissue, sliding the finger grippers back into the wand holding firmly in place while using. To dislodge the soiled tissue a user simply just slides the finger grippers back out of the wand and it lets go into the toilet without the need to touch it.

This piece also has a "rinsing hole" in case any soil gets up into the fingers, it can be rinsed out. The curve of the handle makes it easy to reach in those hard-to-reach places when someone is experiencing limited mobility due to an injury or obesity or illness, or other physical limitation such as arthritis. The Freedom Wand™ device can be made out of a dishwasher safe material for ease in cleaning if desired. The Freedom Wand™ device gives individuals the ability to grab onto a cleaning sponge and clean their feet, lower extremities, back and in their body folds. The Freedom Wand™ device gives them the ability to grab onto a smaller piece of tissue/gauze pad which has ointment/lotion on it and apply it to their raw, hard-to-reach areas, including back and bottom. The Freedom Wand™ device gives ladies the ability to grab onto a shaver and shave the lower parts of their leg which is hard to reach with limited mobility, as well as gives men the ability to shave facial areas.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A personal hygiene device comprising:
a tubular handle defining a longitudinal direction, the tubular handle having first and second ends and a side wall defined therebetween, the side wall defining an interior cavity, the tubular handle further having an arcuate region defined between the first end and the second end at a location between midpoint and the first end;
a gripping mechanism with gripping members located at the first end and that are adapted to move between an open position and a retaining position, the gripping members when in the retaining position being configured to retain a section of an article with a remainder of the article extending from and/or retained by the gripping members, wherein the article is at least one of the following: toilet paper, a wipe, a make-up applicator, a sponge, a lotion applicator, a toothbrush, a washcloth;
a button projecting through the side wall, located adjacent the second end and operably connected to the gripping members for moving the gripping members between the open and retaining positions; and
the tubular handle including a laterally-facing rinse inlet hole, defined in the side wall in the arcuate region rearward of the gripping mechanism and forward of the button, the rinse hole being configured to receive water and sanitizer and to direct same through the interior cavity toward the gripping members to cleanse and wash the same after use.

2. The personal hygiene device defined in claim 1, wherein the article is at least one of the following: a personal shaver, a hair brush, a lipstick applicator, a back scratcher, an eating utensil, a writing pencil, an ink pen, a marker.

* * * * *